(12) United States Patent
Ikebata

(10) Patent No.: US 6,226,404 B1
(45) Date of Patent: May 1, 2001

(54) ON-LINE CHARACTER RECOGNITION SYSTEM

(75) Inventor: Yoshikazu Ikebata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/092,011

(22) Filed: Jun. 4, 1998

(30) Foreign Application Priority Data

Jun. 9, 1997 (JP) ................................................... 9-150797

(51) Int. Cl.⁷ ................................ G06K 9/00; G06K 9/36
(52) U.S. Cl. .................... 382/187; 382/181; 382/188; 382/289; 382/290
(58) Field of Search ................................... 382/181, 187, 382/188, 289, 290, 287, 314

(56) References Cited

U.S. PATENT DOCUMENTS

| | | | |
|---|---|---|---|
| 4,495,646 | * 1/1985 | Gharachorloo | 382/188 |
| 4,947,156 | * 8/1990 | Sato et al. | 345/178 |
| 5,101,439 | * 3/1992 | Kiang | 382/289 |
| 5,333,209 | * 7/1994 | Sinden et al. | 382/187 |
| 5,453,761 | * 9/1995 | Tanaka | 345/179 |
| 5,544,260 | * 8/1996 | Chefalas et al. | 382/187 |
| 5,588,073 | * 12/1996 | Lee et al. | 382/187 |
| 5,615,284 | * 3/1997 | Rhyne et al. | 382/187 |
| 5,633,954 | * 5/1997 | Gupta et al. | 382/187 |
| 5,696,538 | * 12/1997 | Kishi | 345/179 |
| 5,740,273 | * 4/1998 | Parthasarathy et al. | 382/187 |
| 5,835,632 | * 11/1998 | Takasu et al. | 382/187 |
| 5,903,668 | * 5/1999 | Beernink | 382/187 |
| 5,966,460 | * 10/1999 | Porter, III et al. | 382/187 |
| 5,981,884 | * 11/1999 | Sato et al. | 178/19.01 |

FOREIGN PATENT DOCUMENTS

| | | |
|---|---|---|
| 2-201520 | 8/1990 | (JP) . |
| 3-288173 | 12/1991 | (JP) . |
| 6-19614 | 1/1994 | (JP) . |
| 6-150067 | 5/1994 | (JP) . |
| 6-258914 | 9/1994 | (JP) . |
| 6-337963 | 12/1994 | (JP) . |
| 63-269265 | 11/1998 | (JP) . |

OTHER PUBLICATIONS

Beigi, et al "Size Normalzation in On–Line Unconstrained Handwriting Recognition", IEEE, pp. 173, 1994.*

Kobayashi, et al "An On–Line Handwriting Character Recognition Algorithm RAV (Reparameterized Angle Variations)", IEEE, pp. 919–925, Apr. 1997.*

"WACOM UD–Series Digitizer", produced by WACOM, a corporation of Japan, Dec. 20, 1995.

M. Hamanaka, et al., "On–Line Japanese Character Recognition Experiments by an Off–Line Method", Proceeding of the Second International Conference on Document Analysis and Recognition, Oct. 1993, pp. 204–207.

* cited by examiner

Primary Examiner—Jose L. Couso
Assistant Examiner—Daniel G. Mariam
(74) Attorney, Agent, or Firm—McGinn & Gibb, PLLC

(57) ABSTRACT

To provide an on-line character recognition system which can recognize hand-written character patterns correctly by normalizing inclination of input character patterns without additional burden to the user, an on-line character recognition system comprises; a pen-based input device which outputs inclination angle information of its stylus pen together with pattern data, a slant angle detector for obtaining a slant angle of the stylus pen representing an angle of vertical projection of the stylus pen, a slant angle register for storing a standard slant angle, a slant compensation section for outputting compensated data set by compensating the pattern data making use of the slant angle and the standard slant angle, and a character recognition section for recognizing a character from the compensated data set.

15 Claims, 6 Drawing Sheets

ON-LINE CHARACTER RECOGNITION SYSTEM

BACKGROUND OF THE INVENTION

The present invention relates to an on-line character recognition system for recognizing characters input by handwriting, making use of a pen-based input device.

In many conventional on-line character recognition systems, the character recognition is performed by examining matches of input character patterns to reference character patterns prepared beforehand. Therefore, it is required for precise recognition that the direction of the input character patterns not be different from the direction of the reference character patterns. However, when the input character patterns are hand-written, especially making use of a small tablet of an electronic pocket book, for example, the input character patterns may often be written by being inclined against the input frame or the tablet, a factor which degrades recognition performance.

To overcome this problem, some devices for normalizing the direction of the inclined character patterns have been proposed, as disclosed in Japanese patent application laid open as a Provisional Publication No. 269265/'88 (hereafter called the first prior art) or Japanese patent application laid open as a Provisional Publication No. 337963/'94 (hereafter called the second prior art).

In the first prior art, a straight line 10, as illustrated in FIG. 6, is written by a user before the user begins to input characters for indicating his preferred pattern inclination to be hand-written. Along the straight line 10, the user writes an intended pattern 9 of a character 'A', for example. By normalizing the pattern direction, referring the inclination of the straight line 10, an on-line character recognition system of the first prior art performs the pattern matching of the intended pattern 9.

For indicating the preferred pattern inclination, a rotary switch 11 of FIG. 7 is also proposed in the first prior art. The user manipulates the rotary switch 11 according to the inclination of the handwritten pattern 9 instead of writing the straight line 10. The on-line character recognition system of the first prior art normalizes the pattern direction referring to the rotation angle of the rotary switch 11.

In the second prior art, which is intended to be applied when two or more users facing each other input handwriting characters using a single tablet, for example, the direction of an input pattern are discriminated according to where the input pattern is written in the tablet or by which stylus pen the input pattern is written, by preparing two or more stylus pens. For each input field, or each stylus pen, a character direction is preset and the coordinates of the input pattern are normalized according to the character direction. The character direction may be discriminated making use of information of a beginning point of character strings or an input mode designated by the user.

However, with the inclination normalization method of the first prior art, the user is forced to write the straight line 10 or to manipulate the rotary switch 11 for indicating the pattern direction, which is burdensome for the user.

According to the second prior art, the pattern inclination cannot be normalized but with the character direction preset for each input field of the stylus pen. Therefore, when the character pattern is written differently to the preset character direction, it may not be recognized correctly, which is the same when the character direction is discriminated making use of other information.

SUMMARY OF THE INVENTION

Therefore, a primary object of the present invention is to provide an on-line character recognition system which can recognize handwritten character patterns correctly by normalizing inclination of input character patterns precisely, with little additional burden charged to the user, by making use of information of inclination angle of a stylus pen itself used for writing the character patterns.

In order to achieve the object, an on-line character recognition system of the invention comprises;

a pen-based input device for outputting data of a character pattern hand-written with a stylus pen on an input plane of the pen-based input device, and outputting inclination angle information of the stylus pen in reference to the input plane, a slant angle detector for obtaining a slant angle of the stylus pen from the inclination angle information, said slant angle representing an angle of vertical projection of the stylus pen on the input plane;

a slant angle register for storing standard slant angle data of the stylus pen, a slant compensation section for outputting compensated data set by compensating the data of the character pattern output from the pen-based input device making use of the slant angle obtained by the slant angle detector and the standard slant angle data registered in the slant angle register, and a character recognition section for recognizing a character represented by the compensated data set output from the slant compensation section.

There is a substantial correspondence between the direction of a character pattern and the slant angle of the stylus pen with which the character pattern is written. When the slant angle changes, the direction of the character pattern changes substantially with the same degree. Therefore, the inclination of input character patterns can be normalized correctly and a precise character recognition result can be obtained according to the invention without any additional burden charged to the user.

As to the standard slant angle data, it may be predetermined according to a statistical examination, or it may be obtained from output of the slant angle detector corresponding to the data of a character hand-written by a user for a learning procedure.

The standard slant angle data may be classified for each writing style classification of users, providing a selector for selecting appropriate standard slant angle data to be referred to by the slant compensation section from the standard slant angle data according to a writing style of one of the users.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
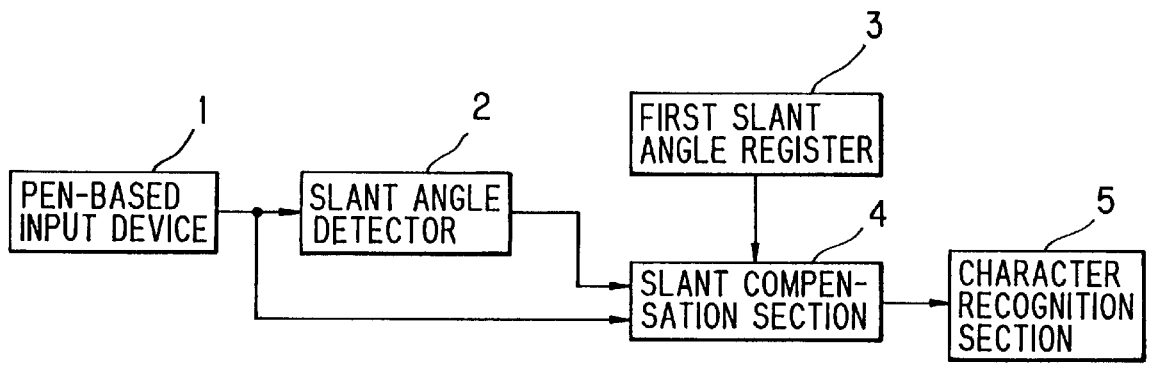
FIG. 1 is a block diagram illustrating a first embodiment of the invention.

FIG. 1 is a block diagram illustrating a first embodiment of the invention.

Referring to FIG. 1, an on-line character recognition system according to the first embodiment comprises;

a pen-based input device 1 for outputting data of a character pattern hand-written with a stylus pen on an input plane thereof, and outputting inclination angle information of the stylus pen in reference to the input plane, a slant angle detector 2 for obtaining a slant angle of the stylus pen from the inclination angle information, said slant angle representing an angle of vertical projection of the stylus pen on the input plane, a first slant angle register 3 wherein a standard slant angle of the stylus pen is registered, a slant compensation section 4 for compensating the data of the character pattern output from the pen-based input device 1 making use of the slant angle obtained by the slant angle register 3, and a character recognition section 5 for recognizing a character represented by the character pattern data compensated by the slant compensation section 4.

There are pen-based input devices which can output inclination angle information of the stylus pen, whereof an example is a digitizer named "WACOM UD-Series Digitizer" and produced by WACOM corporation in Japan.

Figure 3:
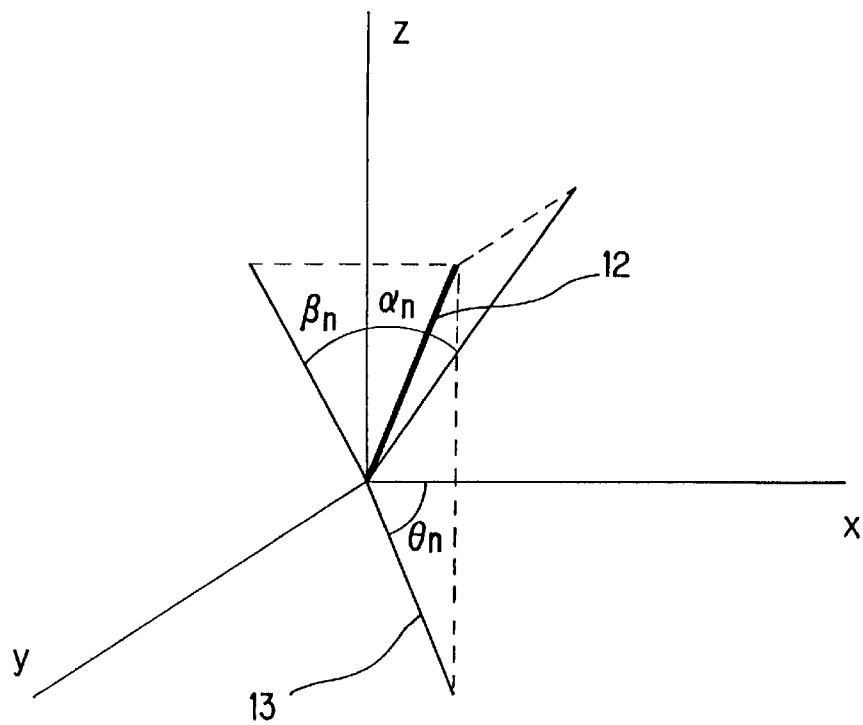
FIG. 3 is a schematic diagram illustrating relation between inclination angle and the slant angle of a stylus pen 12.

FIG. 3 is a schematic diagram illustrating relation between inclination angle and the slant angle of a stylus pen 12, wherein X and Y-axis represent orthogonal coordinates on an input plane and Z-axis represents a normal direction of the input plane.

In the "WACOM UD-Series Digitizer", by detecting components of a weak electromagnetic field generated on the input plane with coils provided in the stylus pen, information of an $\chi$-directional inclination angle $\alpha_n$ (angle to the Z-axis of XZ projection of the stylus pen 12) and a y-directional inclination angle $2_n$ (angle to the Z-axis of YZ projection of the stylus pen 12) of FIG. 3 is output (n denoting n-th sampling timing), in a format as described in "WACOM command reference for WACOM UD-Series Digitizer", vol. 4, page 4.

The slant angle detector 2 calculates the slant angle $\theta_n$, that is, an angle to the X-axis of XY projection 13 of the stylus pen 12.

In the following paragraphs, the embodiments of the invention will be described in connection with examples wherein information of the $\chi$-directional inclination angle $\alpha_n$ and the y-directional inclination angle $\beta_n$ of the stylus pen 12 is output from the pen-based input device 1, such as in the above described "WACOM UD-Series Digitizer".

However, on condition that necessary information for calculating the above slant angle $\theta_n$ of the stylus pen 12, namely, directional information of the writing hand of the user in reference to the input plane, can be obtained together with data of the input pattern, any other appropriate pattern input device may be applied to the pen-based input device 1 of the invention.

Figure 2:
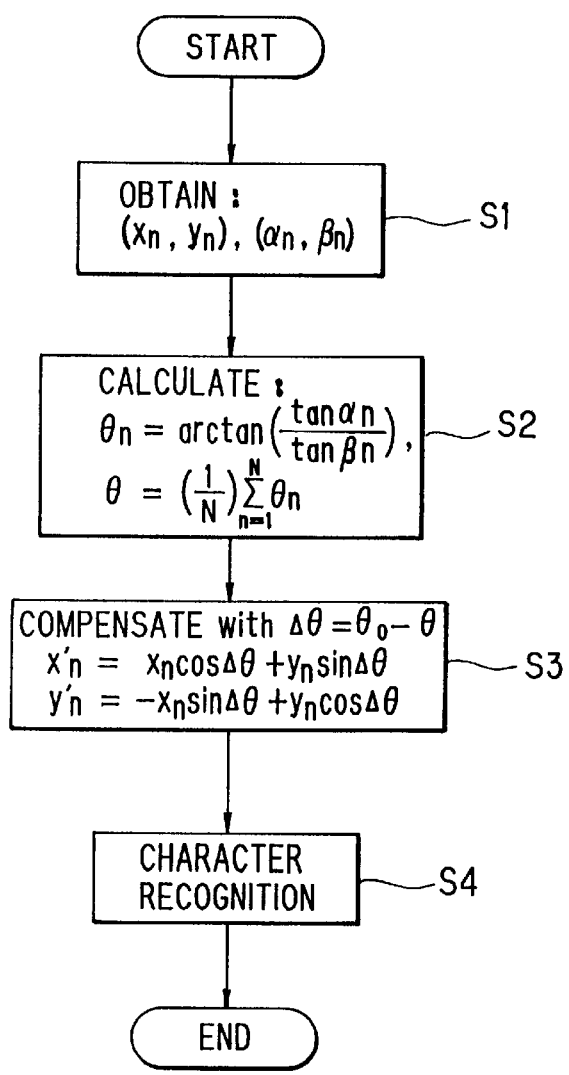
FIG. 2 is a flowchart illustrating operation of the first embodiment of FIG. 1.

Now, operation of the first embodiment is described referring to FIG. 1 and a flowchart of FIG. 2.

The pen-based input device 1 outputs (at step S1) coordinate data obtained by sampling coordinates $(\chi_n, y_n)$ of each stroke, or locus, of a character written by the stylus pen 12 on the input plane at fixed time intervals (n=1, 2, ..., N; N being total sampling number of the character), during the stylus pen is touching the input plane, together with the inclination angle information $(\alpha_n, \beta_n)$ of the stylus pen 12 at each sampling timing.

The slant angle detector 2 obtains the slant angle $\theta_n$ of the stylus pen 12 according to following equation (1), and calculates an average slant angle $\theta$ for the character according to following equation (2) (at step S2).

$$\theta_n = \arctan\left(\frac{\tan\beta_n}{\tan\alpha_n}\right) \quad (1)$$

$$\theta = \left(\frac{1}{N}\right)\sum_{n=1}^{N} \theta_n \quad (2)$$

The slant compensation section 4 calculates a compensation angle $\Delta\theta$ from the average slant angle $\theta$ and the standard slant angle $\downarrow_0$ registered in the first slant angle register 3 as $\Delta\theta=\theta_0-\theta$, and outputs a compensated data set P={$(\chi'_n,y'_n)$ |n=1,2, ..., N} of the character pattern by compensating each coordinate data $(\chi_n,y_n)$ according to following equations (at step S3).

$$\chi'_n = \chi_n\cos\Delta\theta + y_n\sin\Delta\theta \quad (3)$$

$$y'_n = -\chi_n\sin\Delta\theta = y_n\cos\Delta\theta \quad (4)$$

The character recognition section 5 identifies (at step S5) a character from the compensated data set P by way of a pattern matching technique, for example, such as described in "On-Line Japanese Character Recognition Experiments by an Off-Line Method Based on Normalization-cooperated Feature Extraction", by Hamanaka, et al., pp. 204–207 of the Proceeding of the second international conference on document analysis and recognition, (Oct. 1993).

As to the standard slant angle $\theta_0$, the slant angle of the stylus pen, which is statistically obtained when sufficiently large number of users write characters in correct direction to the input plane, is registered in the first slant angle register 3. There is a substantial correspondence between the direction of a character pattern and the slant angle of the stylus pen with which the character pattern is written. When the slant angle changes, the direction of the character pattern changes substantially with the same degree. Therefore, the inclination of input character patterns can be normalized correctly and a precise character recognition result can be obtained according to the embodiment without any additional burden charged to the user.

Figure 4:
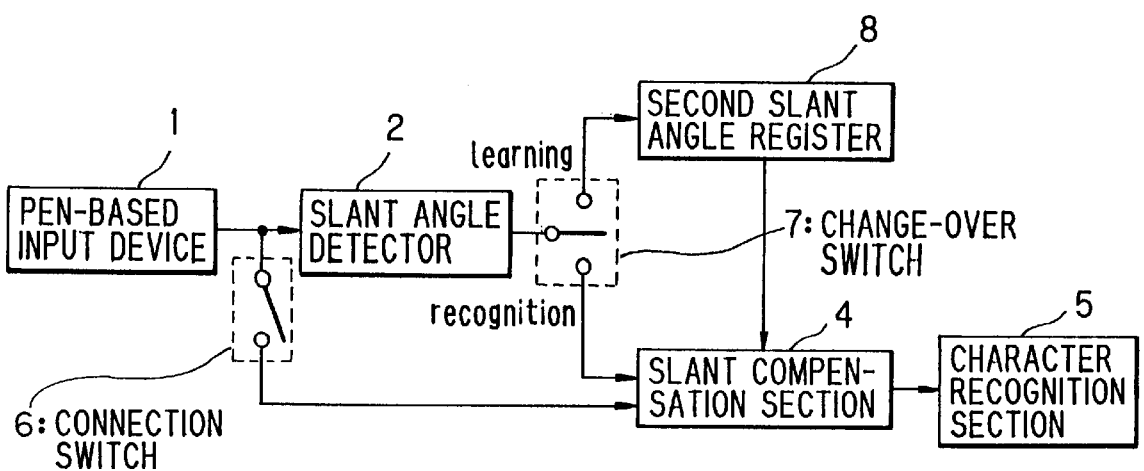
FIG. 4 is a block diagram illustrating a second embodiment of the invention.

FIG. 4 is a block diagram illustrating a second embodiment of the invention.

Compared to the first embodiment of FIG. 1, the first slant angle register 3 of FIG. 1 is replaced with a second slant angle register 8, and a connection switch 6 provided between the pen-based input device 1 and the slant compensation section 4, and a changeover switch 7 for changing over the output of the slant angle detector 2 to the second slant angle register 8 are comprised in the second embodiment of FIG. 4.

In the second embodiment, the standard slant angle $\theta_0$ registered in the second slant angle register 8 can be adapted to a specific user by learning his own slant angle, which is performed by controlling the connection switch 6 and the changeover switch 7 in a learning mode.

The connection switch 6 is controlled to be open, and the changeover switch 7 is turned towards the second slant angle register 8, when the on-line character recognition system of FIG. 4 is controlled in the learning mode, and they are controlled to the other side, when the character recognition is performed in a recognition mode.

The second slant angle register 8 stores the standard slant angle $\theta_0$ adapted to the specific user. However, the standard slant angle $\theta_0$ is a reference value and may be prepared for each individual user or for each group of users having the same writing style, providing a selector (not depicted in the drawings), for example, for selecting a standard slant angle $\theta_0$ corresponding to each user or each user group from data registered in the second slant angle register 8.

Figure 5A:
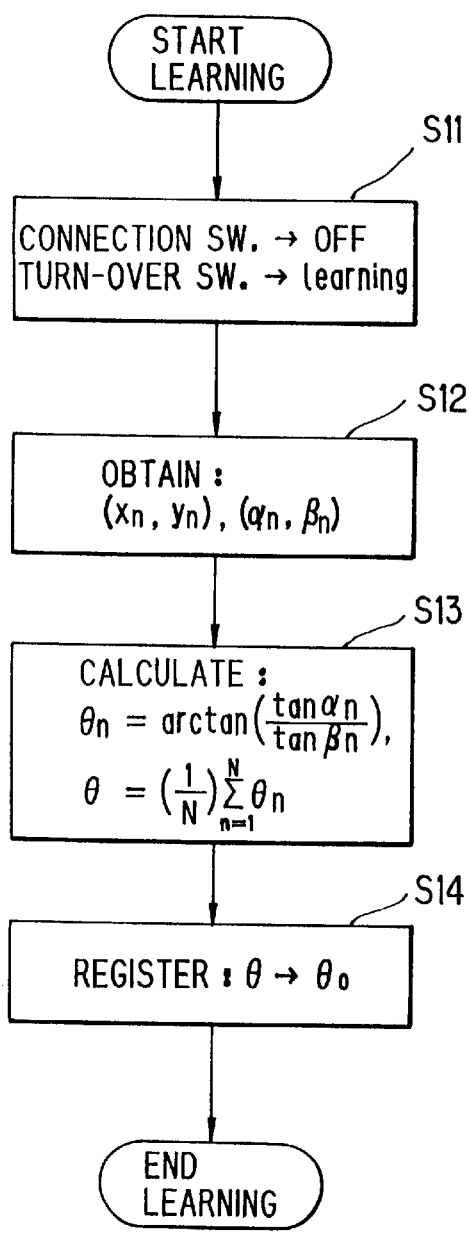
FIG. 5A is a flowchart illustrating operation of the second embodiment of FIG. 4 controlled in a learning mode.
Figure 5B:
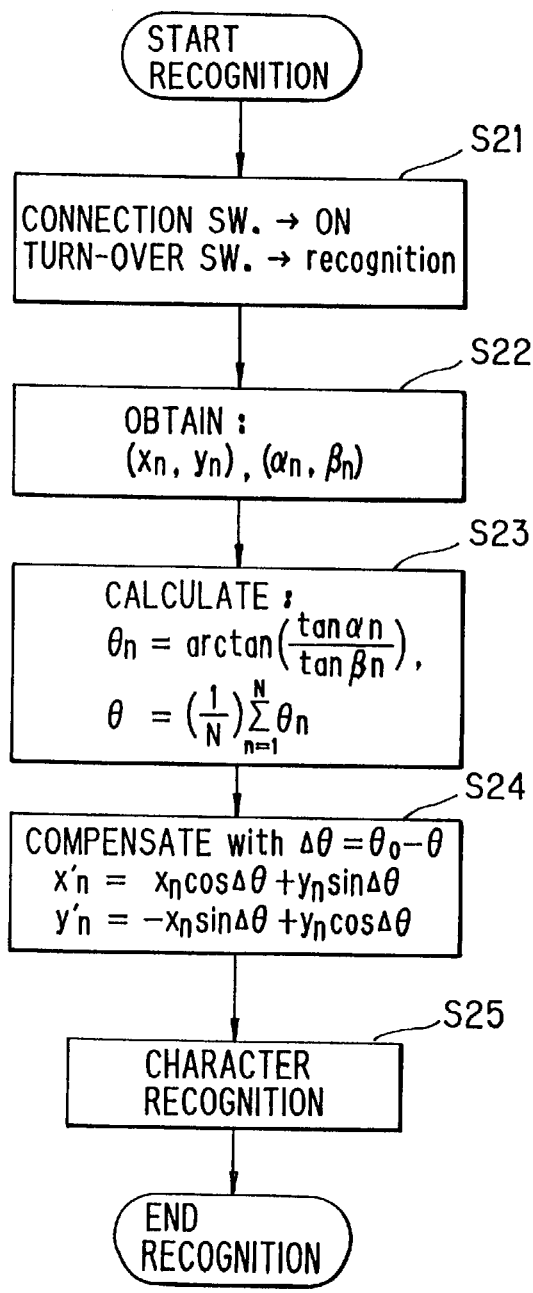
FIG. 5B is a flowchart illustrating operation in a recognition mode of the second embodiment.
Figure 6:
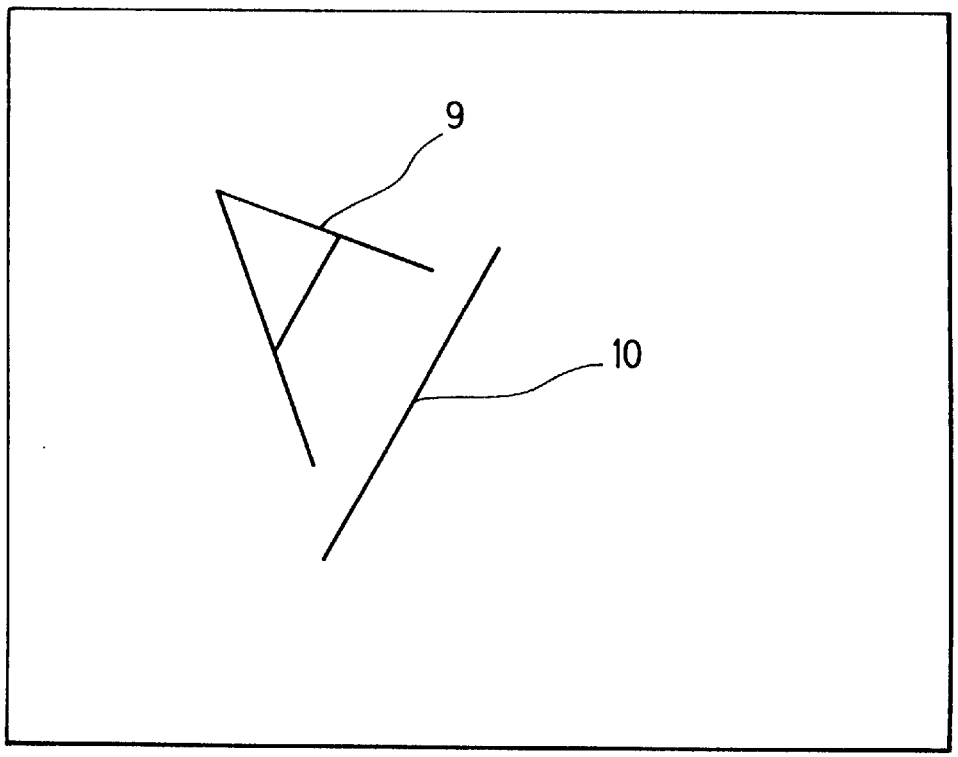
FIG. 6 is a schematic diagram illustrating a straight line 10 to be written in a first prior art for indicating a preferred pattern inclination.
Figure 7:
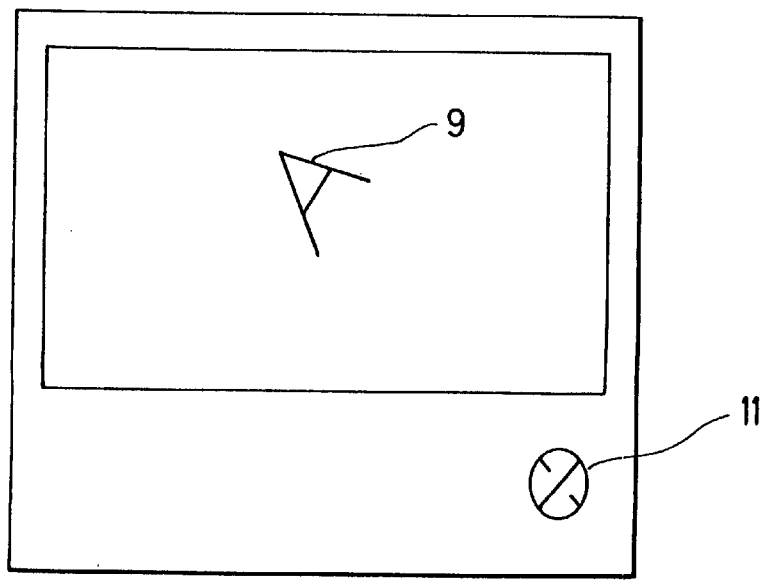
FIG. 7 is a schematic diagram illustrating a rotary switch 11 to be manipulated in the first prior art for indicating a preferred pattern inclination.

Now, operation of the second embodiment is described referring to FIG. 4 and flowcharts of FIGS. 5A and 5B.

FIG. 5A illustrates operation of the second embodiment in the learning mode.

For beginning the learning procedure, the connection switch 6 is made open and the changeover switch 7 is turned towards learning side (at step S11) for connecting output of the slant angle detector 2 to the second slant angle register 8. The coordinate data $(\chi_n, y_n)$ and the inclination angle information $(\alpha_n, \beta_n)$ are extracted (at Step S12) and an average slant angle $\theta$ are calculated (at step S13) of input patterns written for the learning procedure, in the same way with steps S2 and S3 of FIG. 2, respectively. The average slant angle $\theta$ thus obtained is registered in the second slant angle register 8 (at step S14) as the standard slant angle $\theta_0$.

FIG. 5B illustrates operation of the second embodiment in the recognition mode.

For performing the character recognition, the connection switch 6 is closed and the changeover switch 7 is turned towards recognition side (at step S21) for connecting output of the slant angle detector 2 to the slant compensation section 4. The coordinate data $(\chi_n, y_n)$ and the inclination angle information $(\alpha_n, \beta_n)$ are extracted (at step S22) and an average slant angle $\theta$ are calculated (at step S23) for each input character pattern, in the same way with steps S2 and S3 of FIG. 2, respectively.

The slant compensation section 4 calculates (at step S24) the compensation angle $\Delta\theta$ as $\Delta\theta = \theta_0 - \theta$ referring to the standard slant angle $\theta_0$ registered in the second slant angle register 8 in the learning mode, and outputs the compensated data set P, which is supplied to the character recognition section 5 for identifying (at step S25) the hand-written character, in the same way with steps S3 and S4 of FIG. 2.

As above described, still more precise character recognition can be performed according to the second embodiment, by adapting the standard slant angle $\theta_0$ to the users' writing style by learning the slant angle with character patterns correctly hand-written by each specific user.

In the following paragraphs, concrete examples of the slant compensation and the slant angle learning according to the above embodiments will be described.

Figure 8:
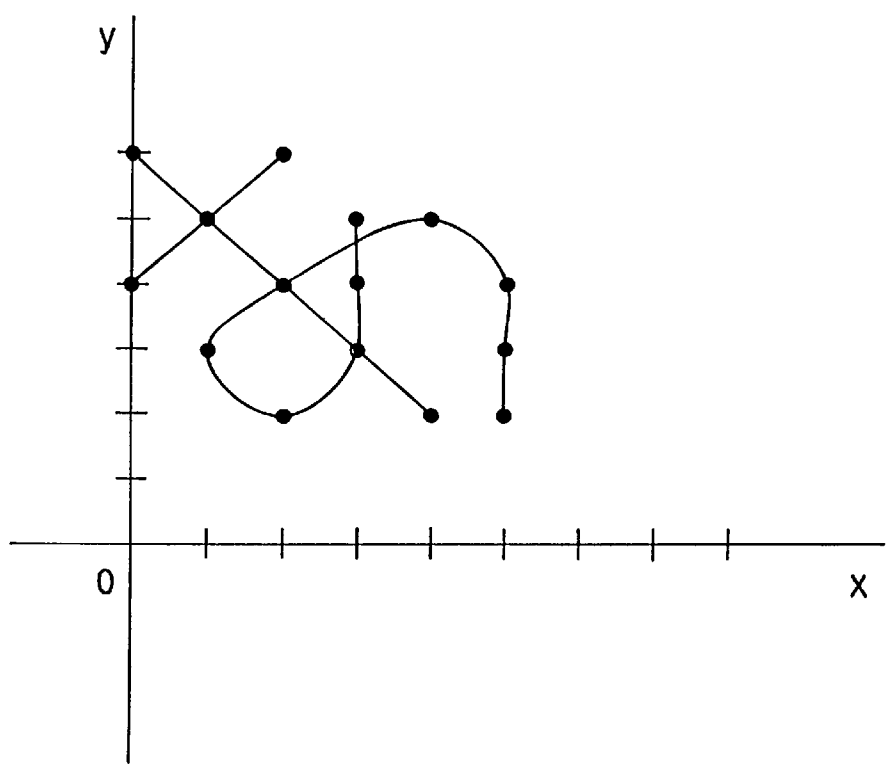
FIG. 8 is a schematic diagram illustrating a character pattern of 'あ'(the first letter of Japanese alphabets) hand-written on an input plane of the pen-based input device 1 of FIG. 1.

Suppose a user inputs a character pattern of 'あ'(the first letter of Japanese alphabets) as illustrated in FIG. 8, and a coordinate data set of 18 samples $\{(\chi_n, y_n)\}$ (n=1,2, ... , 18) is output together with an inclination angle information set $\{(\alpha_n, \beta_n)\}$ as follows, from the pen-based input device 1 of the first embodiment;

$\{(\chi_n, y_n)\}$ = {(0,4) (1,5) (2,6) (0,6) (1,5) (2,4) (3,3) (4,2) (3,5) (3,4) (3,3) (2,2) (1,3) (2,4) (4,5) (5,4) (5,3) (5,2)};

$\{(\alpha_n, \beta_n)\}$ = {(60°,20°) (58°,23°) (61°,25°) (70°,30°) (68°, 40°) (62°,22°) (63°,32°) (59°, 32°) (80°,40°) (85°,45°) (72°, 30°) (77°,38°) (76°,43°) (59°,43°) (66°, 38°) (70°,36°) (78°, 41°) (77°,39°)}.

The slant angle detector 2 calculates slant angles $\theta_n$ at each sampling timing according to the equation (1) and obtains the average slant angle $\theta$ of the character pattern 'あ' according to the equation (2) as follows.

$\{\theta_n\}$ = {11.9°, 14.9°, 14.5°, 11.9°, 18.7°, 12.1°, 17.7°, 20.6°, 8.4°, 5.0°, 10.6°, 10.2°, 13.1°, 29.3°, 19.2°, 14.8°, 10.5°, 10.6}, $$\theta = \left(\frac{1}{18}\right)\sum_{n=1}^{18} \theta_n = 14.1°.$$

Figure 9:
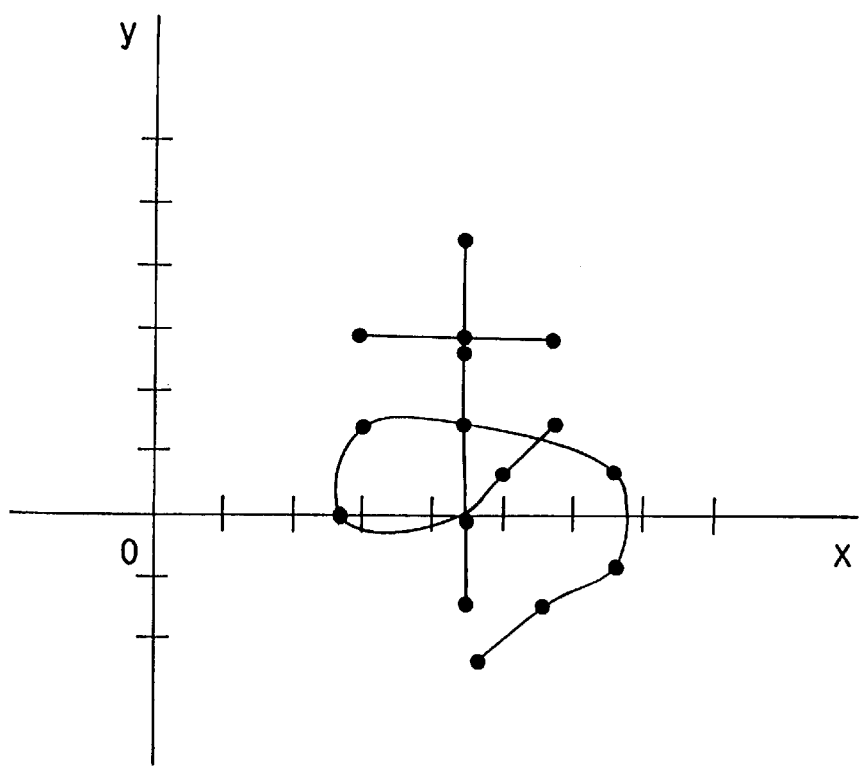
FIG. 9 is a schematic diagram illustrating a compensated pattern of the character 'あ'.

Referring to a standard slant angle $\theta_0 = 60°$ registered in the first slant angle register 3, the slant compensation section 4 calculates the compensation angle $\Delta\theta = \theta_0 - \theta = 60° - 14.1° = 45.9°$, and outputs the compensated data set P as follows, according to the equations (3) and (4), which represents a compensated pattern of the character 'あ' as illustrated in FIG. 9.

P = $\{(\chi'_n, y'_n)\}$ = {(2.9, 2.8) (4.3, 2.8) (5.7, 2.7) (4.3, 4.2) (4.3, 2.8) (4.3, 1.4) (4.2, −0.1) (4.2, −1.5) (5.7, 1.3) (5.0, 0.6) (4.2, −0.1) (2.8, 0.0) (2.9, 1.4) (4.3, 1.4) (6.4, 0.6) (6.4, −0.8) (5.6, −1.5) (4.9, −2.2)}.

The character recognition section 5 performs the pattern matching of the compensated data set P.

Thus, a precise character recognition is performed.

Figure 10:
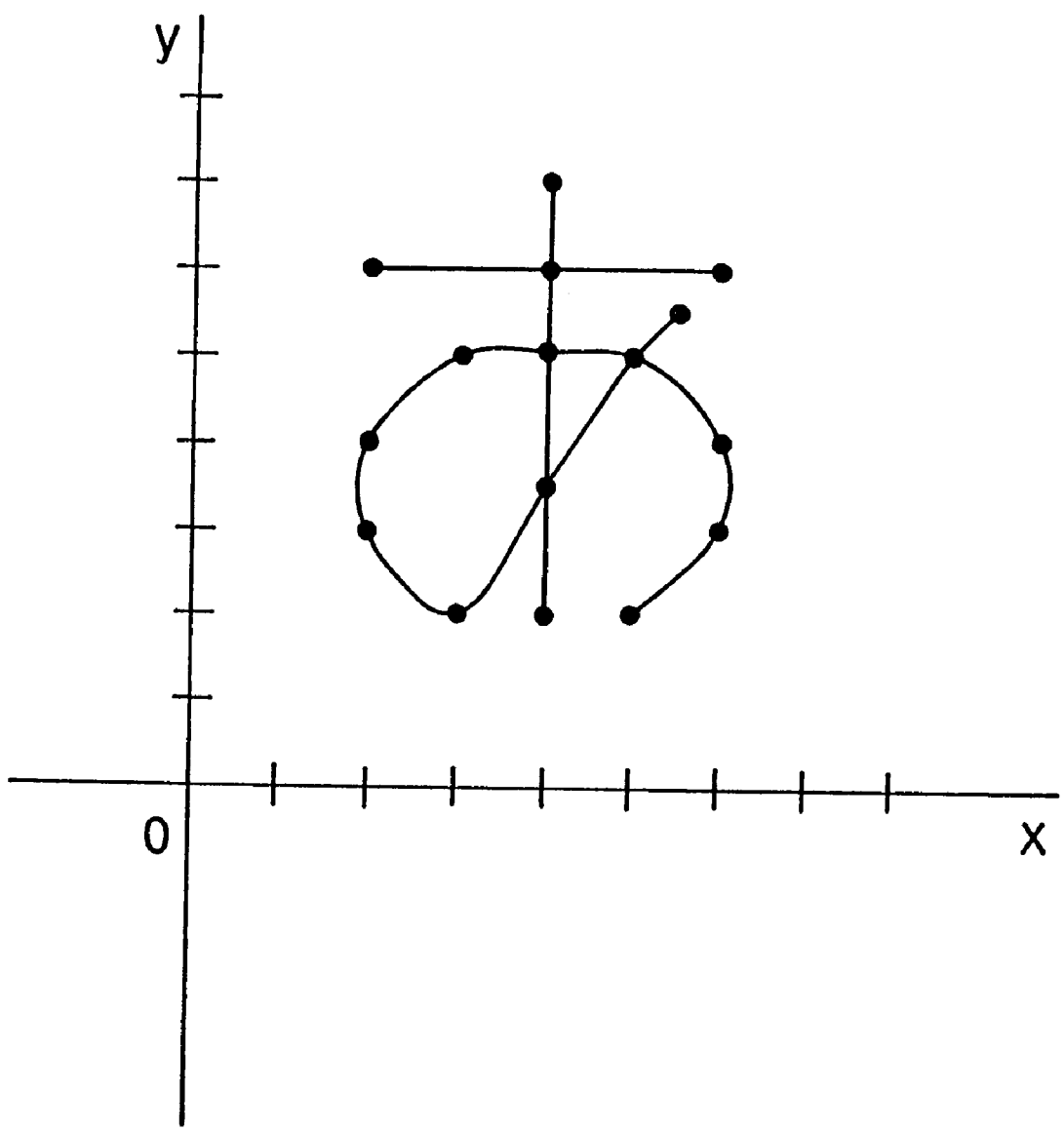
FIG. 10 is a schematic diagram illustrating a character pattern of 'あ' hand-written on the input plane for learning operation.

For learning the standard slant angle $\theta_0$ of a user, the on-line character recognition system of the second embodiment is set in the learning mode, and the user inputs a character pattern 'あ' for example, so as not to slant to the input plane, such as illustrated in FIG. 10.

The character pattern is samples at 20 sample timings and a following inclination angle information set $\{(\alpha_n, \beta_n)\}$(n= 1,2, ... , 20) is output, for example.

$\{(\alpha_n, \beta_n)\}$ = {(50°, 80°) (55°, 78°) (43°, 80°) (62°, 78°) (58°, 78°) (58°, 70°) (52°, 67°) (55°, 64°) (56°, 60°) (48°, 60°) (50°, 62°) (53°, 72°) (54°, 82°) (63°, 82°) (69°, 73°) (54°, 68°) (53°, 62°) (48°, 64°) (55°, 87°)}.

The slant angle detector 2 obtains the average slant angle $\theta = 66.0°$ from the inclination angle information set $\{(\alpha_n, \beta_n)\}$ according to the equations (1) and (2), which is registered in the second slant angle register 8 of FIG. 4, as the standard slant angle $\theta_0$ for the user.

Heretofore, the present invention is described in connection with some embodiments. However, the scope of the invention is not limited in these embodiments. For example, the slant angle detector 2 may output other values such as a least mean square value of the slant angles $\{\theta_n\}$, in place of the simple average $$\theta = \left(\frac{1}{N}\right)\sum_{n=1}^{N} \theta_n,$$

or the compensation angle $\Delta\theta$ may be calculated according to other functions of the standard slant angle $\theta_0$ and the output $\theta$ of the slant angle detector 2, than the simple difference between them.

What is claimed is:

1. An on-line character recognition system having a pen-based input device for outputting data of a character pattern hand-written with a stylus pen on an input plane of the pen-based input device and outputting inclination angle information of the stylus pen in reference to the input plane, said on-line character recognition system comprising:

a slant angle detector for obtaining a slant angle of the stylus pen from the inclination angle information, said slant angle representing an angle of vertical projection of the stylus pen on the input plane;

a slant angle register for storing standard slant angle data of the stylus pen;

a slant compensation section for outputting a compensated data set by compensating the data of the character pattern output from the pen-based input device making use of the slant angle obtained by the slant angle detector and the standard slant angle data registered in the slant angle register; and a character recognition section for recognizing a character represented by the compensated data set output from the slant compensation section, wherein said slant angle detector calculates an average slant angle of the character based upon a fixed time interval sampling of a plurality of stroke coordinates and said inclination angle information of said stylus pen at each sample timing.

2. The on-line character recognition system as recited in claim 1, wherein the standard slant angle data is pre-determined.

3. The on-line character recognition system as recited in claim 2, wherein the standard slant angle data is pre-determined according to a statistical examination.

4. The on-line character recognition system as recited in claim 1, wherein the standard slant angle data is obtained from output of the slant angle detector corresponding to the data of a character pattern hand-written by a user for a learning procedure.

5. The on-line character recognition system as recited in claim 1, wherein the standard slant angle data is classified for each writing style classification of users of the on-line character recognition system, and wherein a selector is further provided for selecting appropriate standard slant angle data to be referred to by the slant compensation section from the standard slant angle data according to a writing style of one of the users.

6. An on-line character recognition system having a pen-based input device for outputting data of a character pattern hand-written with a stylus pen on an input plane of the pen-based input device, and outputting inclination angle information of the stylus pen in reference to the input plane, said on-line character recognition system comprising:

a slant angle detector for obtaining a slant angle of the stylus pen from the inclination angle information, said slant angle representing an angle of vertical projection of the stylus pen on the input plane, wherein said slant angle detector calculates an average slant angle of the character based upon a fixed time interval sampling of a plurality of stroke coordinates and said inclination angle information of said pen-based input device at each sample timing.

7. The on-line character recognition system, as claimed in claim 6, further comprising:

a slant angle register for storing standard slant angle data of the stylus pen.

8. The on-line character recognition system, as claimed in claim 7, further comprising:

a slant compensation section for outputting compensated data set by compensating the data of the character pattern output from the pen-based input device making use of the slant angle obtained by the slant angle detector and the standard slant angle data registered in the slant angle register.

9. The on-line character recognition system, as claimed in claim 8, further comprising:

a character recognition section for recognizing a character represented by the compensated data set output from the slant compensation section.

10. The on-line character recognition system as recited in claim 9, wherein the standard slant angle data is pre-determined.

11. The on-line character recognition system as recited in claim 10, wherein the standard slant angle data is pre-determined according to a statistical examination.

12. The on-line character recognition system as recited in claim 7, wherein the standard slant angle data is obtained from output of the slant angle detector corresponding to the data of a character pattern hand-written by a user for a learning procedure.

13. The on-line character recognition system as recited in claim 7, wherein the standard slant angle data is classified for each writing style classification of users of the on-line character recognition system.

14. The on-line character recognition system as recited in claim 13, further comprising:

a selector for selecting standard slant angle data according to a writing style of one of the users.

15. The on-line character recognition system as recited in claim 1, wherein said slant angle detector obtains said slant angle with reference to information in a three dimensional coordinate system, said coordinates being selected using an X axis, a Y axis, and a Z axis.

* * * * *